United States Patent [19]

Ohwe et al.

[11] Patent Number: 5,019,931
[45] Date of Patent: May 28, 1991

[54] MECHANISM FOR SUSPENDING A HEAD SLIDER OF A RECORDING APPARATUS

[75] Inventors: Takeshi Ohwe, Kawasaki; Seiji Yoneoka, Kanagawa; Minoru Takahashi, Kawasaki, all of Japan

[73] Assignee: Fujitsu Limited, Kawasaki, Japan

[21] Appl. No.: 409,473

[22] Filed: Sep. 19, 1989

[30] Foreign Application Priority Data

Sep. 28, 1988 [JP] Japan .................................. 63-242947

[51] Int. Cl.⁵ .......................... G11B 5/48; G11B 21/16
[52] U.S. Cl. ...................................... 360/104; 360/103
[58] Field of Search ................................ 360/103, 104

[56] References Cited

U.S. PATENT DOCUMENTS

| 4,167,765 | 9/1979 | Watrous | 360/104 X |
| 4,720,500 | 2/1988 | Dalziel | 360/103 |
| 4,797,763 | 1/1989 | Levy et al. | 360/103 X |
| 4,868,694 | 9/1989 | Hagen | 360/104 |
| 4,922,356 | 5/1990 | Yamaguchi et al. | 360/103 X |

FOREIGN PATENT DOCUMENTS

| 0155746 | 9/1985 | European Pat. Off. | 360/104 |
| 63-90010 | 4/1988 | Japan | 360/104 |
| 63-225981 | 9/1988 | Japan | 360/104 |
| 64-62876 | 3/1989 | Japan | 360/104 |

*Primary Examiner*—John H. Wolff
*Attorney, Agent, or Firm*—Armstrong, Nikaido, Marmelstein, Kubovcik & Murray

[57] ABSTRACT

A suspension mechanism of a recording disk apparatus has a head slider mounted on a portion of a load beam in the vicinity of the free end of the load beam through a gimbal spring. The gimbal spring has a central leg portion and two side leg portions, all of which are formed in parallel. The head slider is adhered to the top surface of the central leg portion which is lifted from the side leg portions. A protrusion formed on the load beam or on the central leg portion serves to transfer loading force generated by the load beam to the head slider by a universal joint connection. The gimbal spring is mounted on the load beam such that the longitudinal direction of the central leg portion is normal to the seek direction of the head slider.

17 Claims, 6 Drawing Sheets

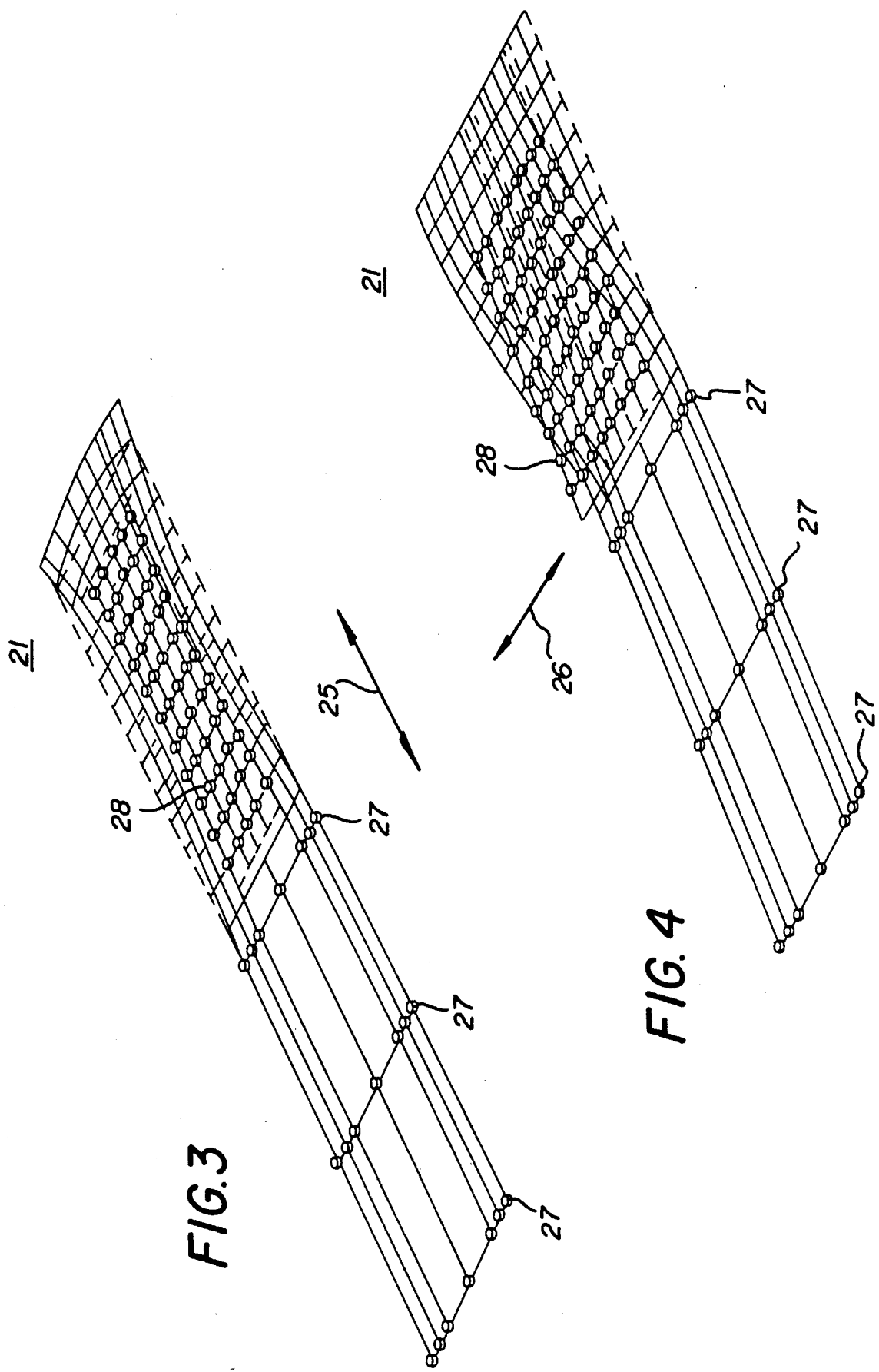

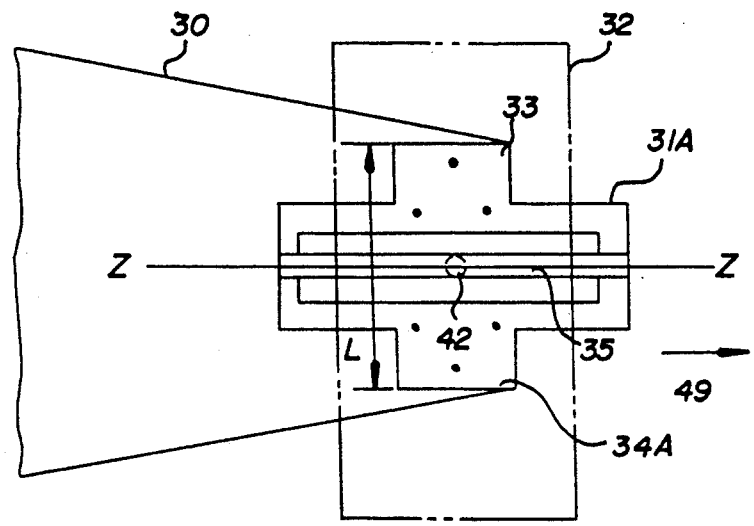
FIG. 14
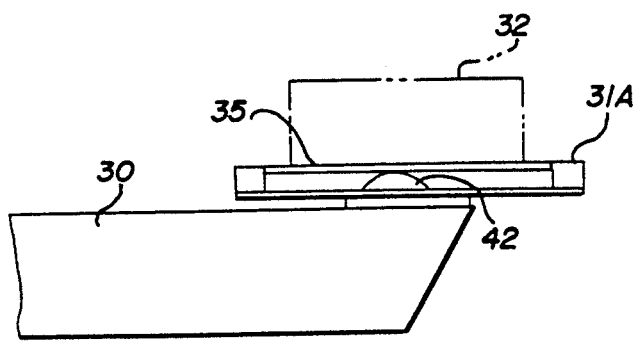
FIG. 15
FIG. 16
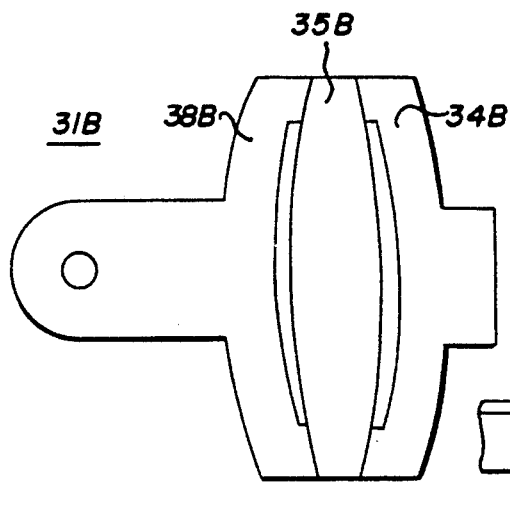
FIG. 17
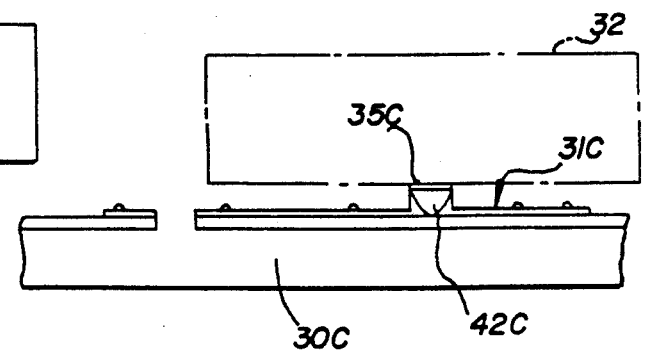

MECHANISM FOR SUSPENDING A HEAD SLIDER OF A RECORDING APPARATUS

BACKGROUND OF THE INVENTION

1. Field of the Invention

The present invention relates to a recording apparatus such as a magnetic recording apparatus or an optical recording apparatus, each having airbearing head sliders (hereinafter simply referred to as a head slider) which is flexibly suspended by a suspension mechanism, carrying a magnetic or an optical transducer over a rotating disk with a constant spacing therebetween. Particularly, it relates to an improvement in a spring member of the suspension mechanism, usually referred to as a gimbal spring, for flexibly mounting the head slider on a load beam of the suspension mechanism.

2. Description of the Related Arts

As is widely known, in a magnetic or an optical recording apparatus, a magnetic or an optical transducer is carried by a head slider which is suspended by a suspension mechanism fixed to a rigid arm of a head positioner such that the may be controllably transferred over a rotating magnetic disk to access a target track of the disk. This is referred to as a seek operation, and the direction in which the head slider is transferred is referred to as a seek direction. Naturally, the seek direction is taken in a substantially radial direction of the relevant magnetic disk. The suspension mechanism comprises a head slider, a load beam and a gimbal spring. The head slider is mounted through the gimbal spring on the free end portion of the load beam which is secured to a rigid arm of the related head positioner at the other end portion.

Before proceeding further, a brief survey is provided regarding various types of relative arrangement between the head positioner and the suspension mechanism, with respect to a seek direction of the head slider.

FIG. 1 is a schematic plan view illustrating three types A, B, and C of positional relationships or the relative arrangements between each head positioner and the relevant suspension mechanism with respect to a disk rotating around its center Q.

The arrangement A is referred to as of the linear type. A rigid arm 2 of a head positioner 1 is moved forward and rearward, namely reciprocally, in a seek direction 3 shown by a two headed arrow, transferring a load beam and a head slider in the seek direction 3 with respect to a disk 12.

The arrangement B is referred to as of the swinging type. A head positioner 4 is rotatable clockwise and counter-clockwise as shown by a double-arrow headed arc, swinging an arm 5. Thus, the relevant head slider suspended by a load beam 13 is transferred over the disk 12 along an arc, namely in a seek direction 6. Hereby, the axial line of the load beam 13 is taken normal to that of the arm 5.

The arrangement C is also referred to as of the swinging type. A head positioner 8 is rotatable clockwise and counter-clockwise, swinging an arm 7 and a load beam 9. Thus the relevant head slider 10 is transferred in a seek direction 11 with respect to the disk 12. Hereby, the longitudinal lines of the load beam 9 and the arm 7 are aligned. As is apparent from the figure, the seek directions 3, 6 and 11 are substantially in the radial direction of the magnetic disk 12.

The linear type arrangement A requires a wide space and reciprocal motion of the head positioner, being rather unsuitable for miniaturizing the associated structure. The arrangements B and C, therefore, are preferably used in a compact type magnetic disk apparatus. However, the head positioner 4 of swinging type B needs a relatively long arm 5, enhancing the rotating inertia moment of the arm 5, which leads to adversely affecting the high speed operation of the magnetic disk apparatus. Consequently, the head positioner 8 of the arrangement C becomes increasingly adopted in a compact and high speed magnetic disk apparatus in recent days. In the present invention, a suspension mechanism for a head slider used in a head positioner of the arrangement C is primarily described.

Now a suspension mechanism for a head slider is described. The head slider is flexibly supported by a suspension mechanism. A typical suspension mechanism, referred to as a Whitney type suspension mechanism, is disclosed in the U.S. Pat. Nos. 3,931,641, published on Jan. 6, 1976, and 4,167,765. published on Sep. 11, 1979, both issued to Watrous. The suspension mechanism of the later have a combined load beam comprising a holding section, a resilient spring section and a substantially rigid section connected to the spring section at one end. At the other end of the rigid section of the load beam, there is fixed a substantially rectangular flexure member having a central finger. A head slider is fixed to the central finger, engaging a rotating magnetic disk with a predetermined spacing therebetween. The spacing is maintained by balancing aerodynamic force provided by an air flow caused by the rotating disk with the resilient force loaded by the relevant load beam. The above described Whitney type is also referred to as a Watrous type, and the flexure member is usually referred to as a gimbal spring.

FIG. 2(a) and FIG. 2(b) are a partial plan view and a side view of a Whitney type suspension mechanism. The whole structure of the suspension mechanism is the same as that described above. A spring member 21, usually referred to as a gimbal spring, is welded to the end portion of a two sided flanged rigid portion 20 of the associated load beam at four points 23 positioned at a supporting portion 21a of the gimbal spring 21. A magnetic transducer 22 (illustrated with chain lines) is fixed to a tongue-like or finger-like central section 21b of the gimbal spring 21. As apparently seen from FIG. 2(a), the central section 21b is connected to a cross leg 21c, being supported in a cantilever suspension, and extending in the longitudinal direction of the load beam. When the head slider of transducer 22 is moved in a seek direction 25 shown by an arrow 25, namely in the direction of the longitudinal center line of the load beam, or in the longitudinal direction of the central section 21b, the mechanical vibration characteristics of the gimbal spring 21 have proved to be favorable for stable seek operation of the transducer 22. When the seek operation is taken in a direction 26 normal to the direction 25, or normal to the longitudinal line of the central section 21b, the mechanical vibration characteristic is substantially unfavorable. This is basically attributed to a low resonant frequency of the gimbal spring 21 in the seek direction 26. The gimbal spring 21 should be designed to have a high resonant frequency in the seek direction since, in general, a low frequency resonant vibration of the gimbal spring 21 is accompanied by rather larger vibration amplitude, and a high frequency resonant vibration with favorably smaller amplitude.

We have performed a computer simulation with regard to mechanical vibration applied to a gimbal spring. There are provided diagrams representing vibration modes of gimbal springs of various types. FIG. 3 is a diagram representing a simulated vibration mode of the gimbal spring of FIG. 2(a) in a seek direction 25 which is in parallel with the longitudinal direction of the central section 21b. The resonant frequency is approximately 37 kHz, sufficiently high to obtain a stable floating movement of the head slider 21 over the relevant rotating disk in a seek direction. FIG. 4 is a diagram of the same in a seek direction 26 which is normal to the longitudinal direction of the central section 21b. The resonant frequency is approximately 5 kHz, unfavorably low causing an unstable seek operation of the head slider 21. In both diagrams, small circles denote the points distributed over the relevant simulated gimbal spring which is deformed by vibration, and underlying dotted figures denote original positions of the corresponding points of the gimbal spring subjected to no vibration. The points 27 and 28 indicate the points at which the central section is fixed to a load beam, and to a head slider respectively.

Consequently, the gimbal spring 21 of FIG. 2(a) is applicable to a suspension mechanism of a recording apparatus having a swinging head positioner disposed in the arrangement B as shown in FIG. 1, whereby a stable movement of the head slider in floating during a seek operation is assured since the seek direction 6 corresponds to the direction 25 of FIG. 2(a). While, the gimbal spring 21 is not applicable to the suspension mechanism of the arrangement C, since the relevant head slider is transferred in the direction 11 which corresponds to the direction 26 of FIG. 2(a). As previously described, the arrangement C is most suitable for a compact and high speed magnetic recording apparatus. An improved gimbal spring suitable for seek operation in all directions has been needed in the art.

Of course, it may be considered that the problem of unstable movement of the head slider during the seek operation might be solved by horizontally turning the direction of the gimbal spring 21 shown in FIG. 2(a) by a right angle with respect to the load beam 20. However, this idea is not practical because of the small area of a portion of the load beam 20 in the vicinity of the free end of the load beam 20 and the resulting asymmetrical structure of the load beam-gimbal spring assembly.

SUMMARY OF THE INVENTION

An object of the present invention is to provide an improved head slider suspension mechanism useful for accessing tracks of a rotating disk of a compact and high speed recording disk apparatus.

Another object of the present invention is to provide a heas slider suspension mechanism having a spring member referred to as a gimbal spring through which a transducer is transferred flexibly lifted over the engaging rotating disk by the suspension mechanism during seeking operations of the head slider.

Still another object of the present invention is to provide a head slider suspension mechanism having an improved gimbal spring carrying a head slider which allows relatively easy and stable pitching and rolling movements of the head slider, particularly in the seek operation of the head slider.

Still another object of the present invention is to provide an improved suspension mechanism for a recording disk apparatus in which the assembly work for mounting a transducer on a gimbal spring is easy and precise, reducing the associated manufacturing cost.

It is still more particular object of the present invention to provide a structure of a gimbal spring by which the gimbal spring obtains favorably high mechanical resonant frequency in the inherent seek direction of the relevant head slider, which enables the head slider to perform a stable and exact seek operation with allowable small pitching and rolling movements.

The above objects are achieved by a suspension mechanism according to the present invention, comprising a load beam fixed to a rigid arm of a head positioner at one end, a gimbal spring fixed to the other end of the load beam, and a head slider carrying a transducer mounted on the head slider. The head slider is flexibly loaded to a rotating disk by the resilient force of the load beam. The force is transmitted to the center point of the gimbal spring through a dimple formed on the load beam in a universal coupling. The gimbal spring has a central portion lifted from the major plane of the gimbal. The head slider is adhered to the top surface of the lifted central section, and the gimbal spring is welded to the surface of the load beam at the opposite side portions of the gimbal spring with respect to a point at which the dimple contacts the the gimbal spring. The gravity center of the head slider is set so as to approximately coincide with the contact point.

The advantages and features of the present invention will be apparent from the following description and claims with reference to the drawings wherein like reference numerals denote like parts.

BRIEF DESCRIPTION OF THE DRAWINGS

FIG. 3 is a diagram representing the vibration mode of the gimbal spring of FIG. 2(a) moved in the longitudinal direction of the relevant load beam, FIG. 4 is a diagram representing the vibration mode of the gimbal spring of FIG. 2(a) moved in the lateral direction, FIG. 14 is a partial plan view of a suspension mechanism of the modified embodiment illustrating a gimbal spring and the assembly relationship thereof between a head slider and a load beam, FIG. 15 is a cross-sectional side view of the suspension mechanism of FIG. 14, taken along a line Z—Z shown in FIG. 14, FIG. 16 is a plan view of a modified gimbal spring having a rounded form, and FIG. 17 is a cross-sectional side view of another modified gimbal spring.

DESCRIPTION OF THE PREFERRED EMBODIMENT

Figure 1:
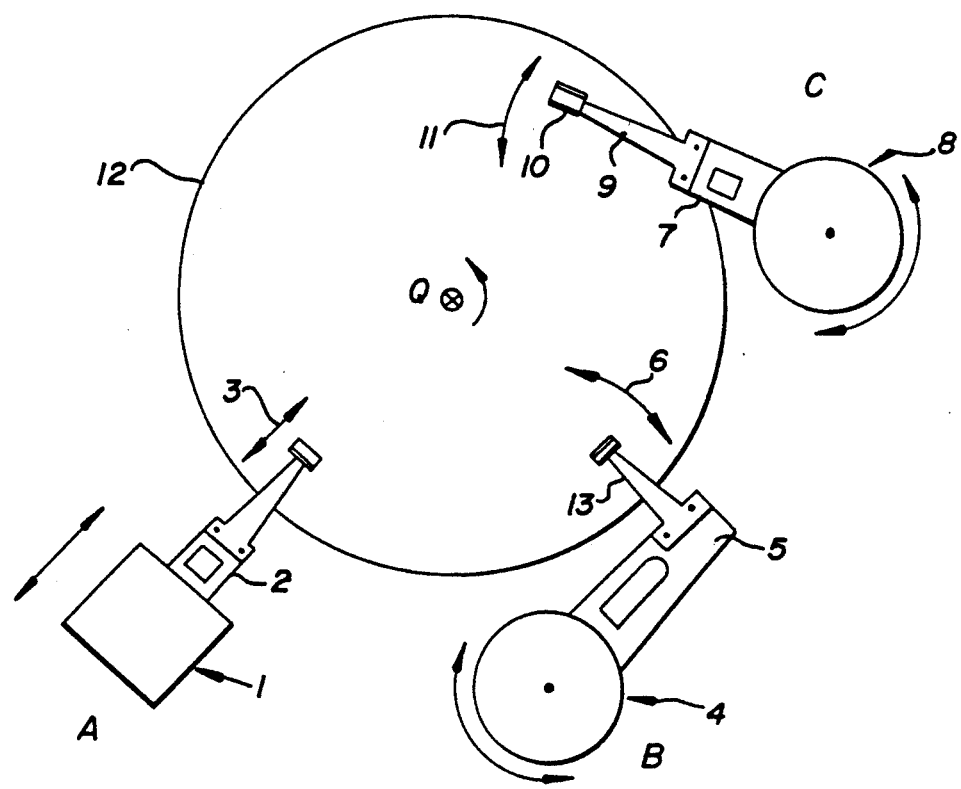
FIG. 1 is a schematic plan view illustrating positional relationships of the arrangements of three types A, B, and C between each head positioner and the relevant suspension mechanism with respect to a disk 12.
Figure 2A:
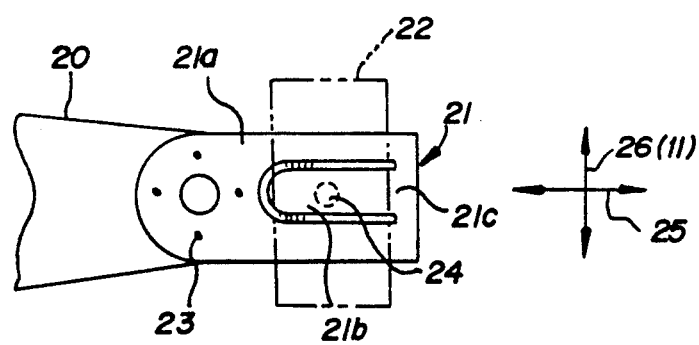
FIG. 2(a) and FIG. 2(b) are respectively a partial plan view and a partial side view, illustrating the structure of a Whitney type suspension mechanism.
Figure 2B:
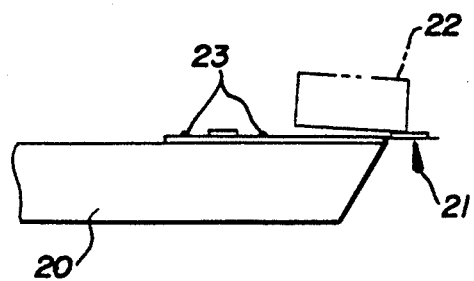
Figure 5:
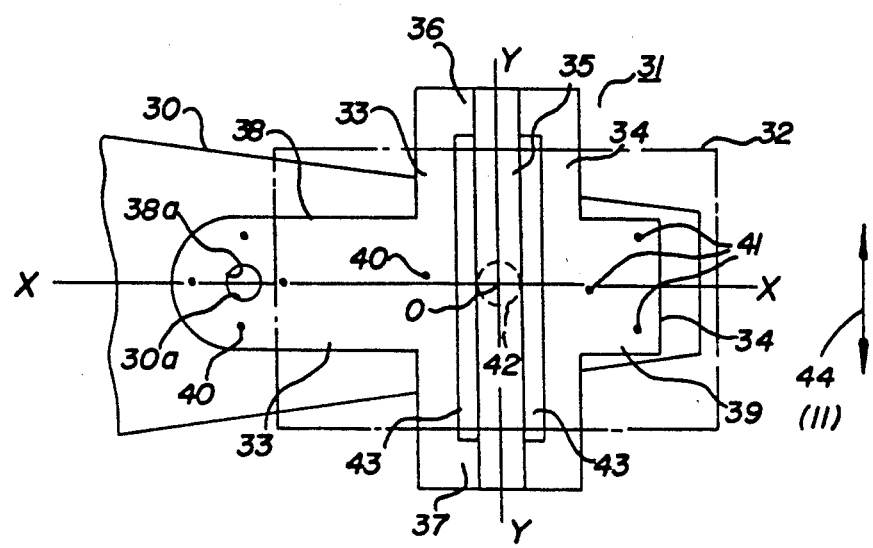
FIG. 5 is a partial plan view of a suspension mechanism of the present invention illustrating a gimbal spring mounted on a load beam.
Figure 6:
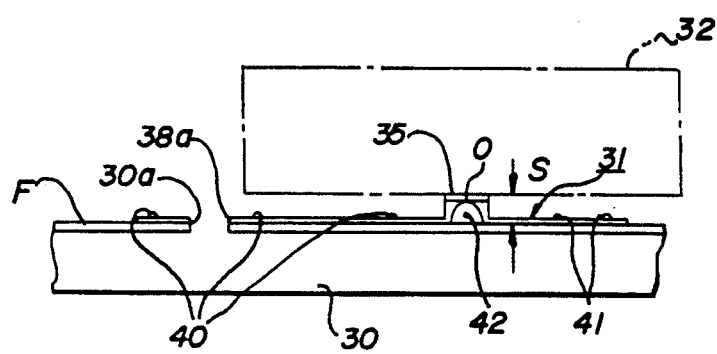
FIG. 6 is a cross-sectional side view of the suspension mechanism of FIG. 5 taken along a line X—X shown in FIG. 5.
Figure 7:
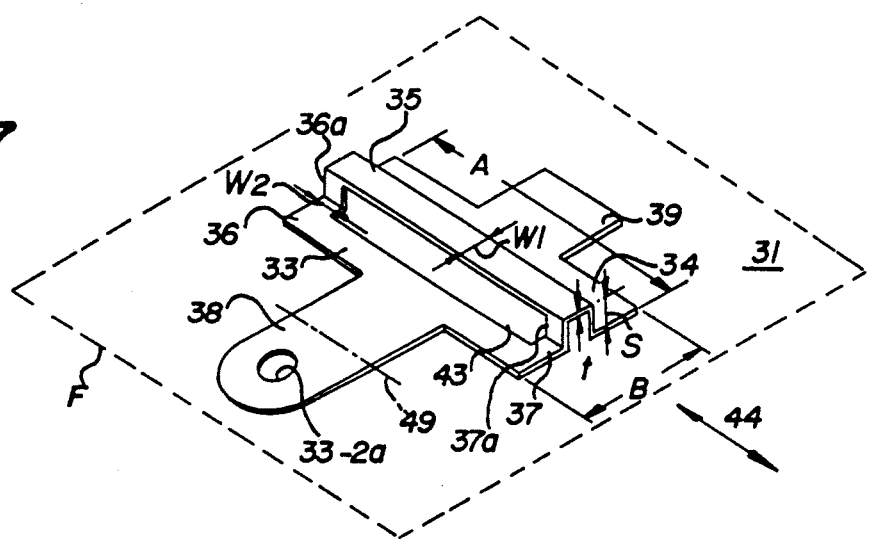
FIG. 7 is a partial perspective view of the suspension mechanism of FIG. 5.
Figure 8:
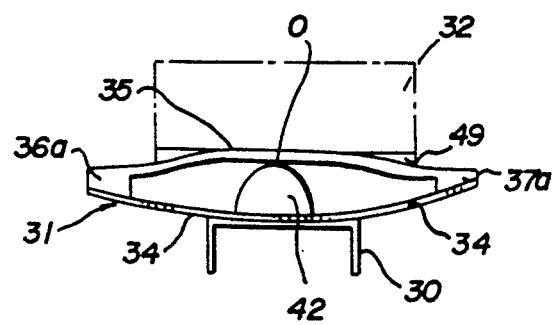
FIG. 8 is a cross-sectional view of the suspension mechanism of FIG. 5, taken along a line Y—Y shown in FIG. 5.

An embodiment according to the present invention is described with reference to drawings of FIG. 5 to FIG. 8. The arrangement of a suspension mechanism and a head positioner of the embodiment is of the above-described type C. FIG. 5 is a partial plan view of a suspension mechanism of the embodiment, illustrating a gimbal spring mounted on a load beam. FIG. 6 is a cross-sectional side view of the suspension mechanism of FIG. 5 taken along a line X—X shown in FIG. 5. FIG. 7 is a partial perspective view of the suspension mechanism of FIG. 5. FIG. 8 is a cross-sectional view of the suspension mechanism of FIG. 5, taken along a line Y—Y shown in FIG. 5. The seek direction of the head slider 32 is shown by an arrow 44 which is in parallel with the line Y—Y.

A head slider 32, shown with chain lines, is carried by a gimbal spring 31 mounted on the free end portion of a load beam 30 which has a relatively rigid structure provided by flanged portions at the both sides thereof. As is shown in the plan view of FIG. 5, the gimbal spring 31 comprises a side leg portion 33 with an outside extending portion, namely a mounting tab 38, another side leg portion 34 with another mounting tab 39, an elevated central leg portion 37, and two cross leg portions 35 and 36. The side leg portions 33 and 34, are located on the both sides of the central leg portion 35. The three leg portions 33, 34, and 35, are disposed in parallel, being spatially separated from each other by two slits 43, and being connected to each other at the opposite ends of the three leg portions 33, 34, and 35 by the transversing cross leg portions 36 and 37. Thus a gimbal spring 31 is formed.

As is easily understood by FIG. 6 and FIG. 7, the side leg portions 33 and 34, and the mounting tabs 38 and 39 lie on the same base plane F. While the central leg portion 35 is supported at the both ends thereof by the cross leg portions 36 and 37, lying on a plane elevated from the base plane F by a step difference S. Both cross leg portions 36 and 37 respectively have folded raised portions 36a and 37a normal to the base plane F of the gimbal spring 31 to elevate the central leg portion 35. In addition, the portions 36a and 37a serve to reduce the width B of the whole gimbal spring 31 without degrading the flexing function which would be provided by a gimbal spring plate formed in a flat plane by extending the gimbal spring 31. Such structure of the central leg portion 35 elevated from the base plane F is a feature of the present invention.

The gimbal spring 31 is made of a resilient metal foil such as stainless steel foil having a thickness t of approximately 30 microns. The dimensions of the gimbal spring 31 shown in FIG. 7 are as follows: the longitudinal length A is approximately 5 mm, the lateral length B is approximately 1.5 mm, the width $W_1$ of the central leg portion 35 is 0.6 mm, and the width $W_2$ of the cross leg portions 36 and 37 is approximately 0.5 mm.

The load beam 30 has an upraised dimple 42 and an aligning hole 30a in a portion adjacent to the free end thereof. Both are located on the longitudinal center line of the load beam 30. The mounting tab 38 has also an aligning hole 38a having the same inner diameter as that of the hole 30a. The gimbal spring 31 is fixed to the end portion of the load beam 30 by welding the mounting tabs 38 and 39 to the top surface of the load beam 30 at five points 40 and three points 41 as shown in FIG. 5 and FIG. 6. Hereby, the position of the gimbal spring 31 relative to the load beam 30 in the longitudinal direction thereof, is precisely provided by aligning the hole 38a of the mounting tab 38 with the hole 30a of the load beam 30. The both mounting tabs 38 and 39 have sufficient spot welding areas enabling the gimbal spring 31 to be easily and surely spot welded to the load beam 30. Otherwise, the welding must be almost impossible since the width of the side leg portions is too small for welding.

On the top surface of the load beam 30 in the vicinity of the free end thereof, a pivot-like raised dimple 42 or a load protrusion 42 is pressed thereinto as shown in FIG. 5, FIG. 6, and FIG. 8. The dimple 42 is formed on the longitudinal center line X—X of the load beam 30. The height of the dimple ranges from 10 to 100 microns. The dimple 42 is located such that, when the gimbal spring 31 is mounted on the load beam 30 by spot welding, the dimple 42 is inserted in the space underneath the central leg portion 35 and the tip of the dimple 42 is in contact with the rear surface of the central leg portion 35 at a point O which is exactly centered with respect to the opposite cross leg portions 36 and 37.

When the height of the dimple 42 is larger than the step difference S between the base plane F of the gimbal spring 31 and the top surface of the central leg portion 35, then the central leg portion 35 and portions of the side leg portions 33 and 34, freely extending from the portion secured to the load beam 30, may be warped in opposite directions concave to each other, forming a slightly ellipsoidal side view as exaggeratedly shown in FIG. 8. When the height of the dimple 42 is smaller than the step difference S, then a small space gap may occur between the dimple 42 and the rear surface of the central leg portion 35. The both cases are allowable for flexibly suspending the head slider 32 over a rotating disk because of the flexible structure of the suspension mechanism, particularly that of the gimbal spring 31. Of course the coincident of the height of the dimple 42 and the step difference S is most desirable.

As shown in FIG. 8, the head slider 32 is mounted on the top surface of the central leg portion 35 by adhering the bottom surface of the head slider 32 to the top surface of the central leg portion 35 with a chemical adhesive material 49. Usually, the gravity center of the head slider 32 is aligned with the contact point O. Even if the top surface of the central leg portion 35 is warped convexly, forming edge-like small clearances between the top surface of the central leg portion 35 and the bottom surface of the head slider 32, these edge-like clearances can be easily filled up with the adhesive material. Thus the head slider 32 is steadily mounted on the central leg portion 35 of the gimbal spring 31. The adhesive material used is a conventional one such as a thermoplastic adhesive.

The step difference S between the base plane F of the gimbal spring 31 and the central leg portion 35 favorably serves to provide an advantage that work for adhering the head slider 32 to the gimbal spring 31 becomes easy and precise.

With the above-described structure of the suspension mechanism of the recording disk apparatus, resilient force is loaded to the head slider 32. The force is loaded to the surface of a recording disk employed in the apparatus when the disk stands still. when the disk is in rotation, the resilient loading force is balanced with an aerodynamic force caused by running air flow adjacent to the surface of the rotating disk. As the result, the head slider 32 is lifted over the disk with a predetermined spacing. As previously described, the resilient loading force is generated by the resilient section of the load beam 30, being transferred to the head slider 32 through a universal joint connection formed at the contact point 0 between the dimple 42 and the rear surface of the central leg portion 35 of the gimbal spring 31. The universal joint connection provides freedom of action of the slider for rolling and pitching thereof in an airbearing operation of the head slider 32. Consequently, the loading force is loaded through the single contact point O locating at the center of the central leg portion 35 of the gimbal spring 31, while the central leg portion 35 is supported at its both ends by the cross leg portions 36 and 37. This is a quite different structure from that of the Whitney type suspension mechanism disclosed in the previously referred U.S. Pat. No. 4,167,765, in which the head slider is mounted on a central finger formed in a cantilever.

In the mechanical point of view, it is to be noted that most of the welding points 40 and 41, namely fixing points of the gimbal spring 31 to the load beam 30, and the contact point O, namely the loading point O, are located on the line X—X which is directed normal to the seek direction 44, and that the welding points 40 and 41 are located at both sides of the loading point O, while the longitudinal direction of the central leg portion 35, to which the head slider 32 is mounted, coincides with the seek direction 44, and the central leg portion 35 is elevated from the base plane F of the gimbal spring 31 and supported at both ends thereof.

Figures 9, 13:
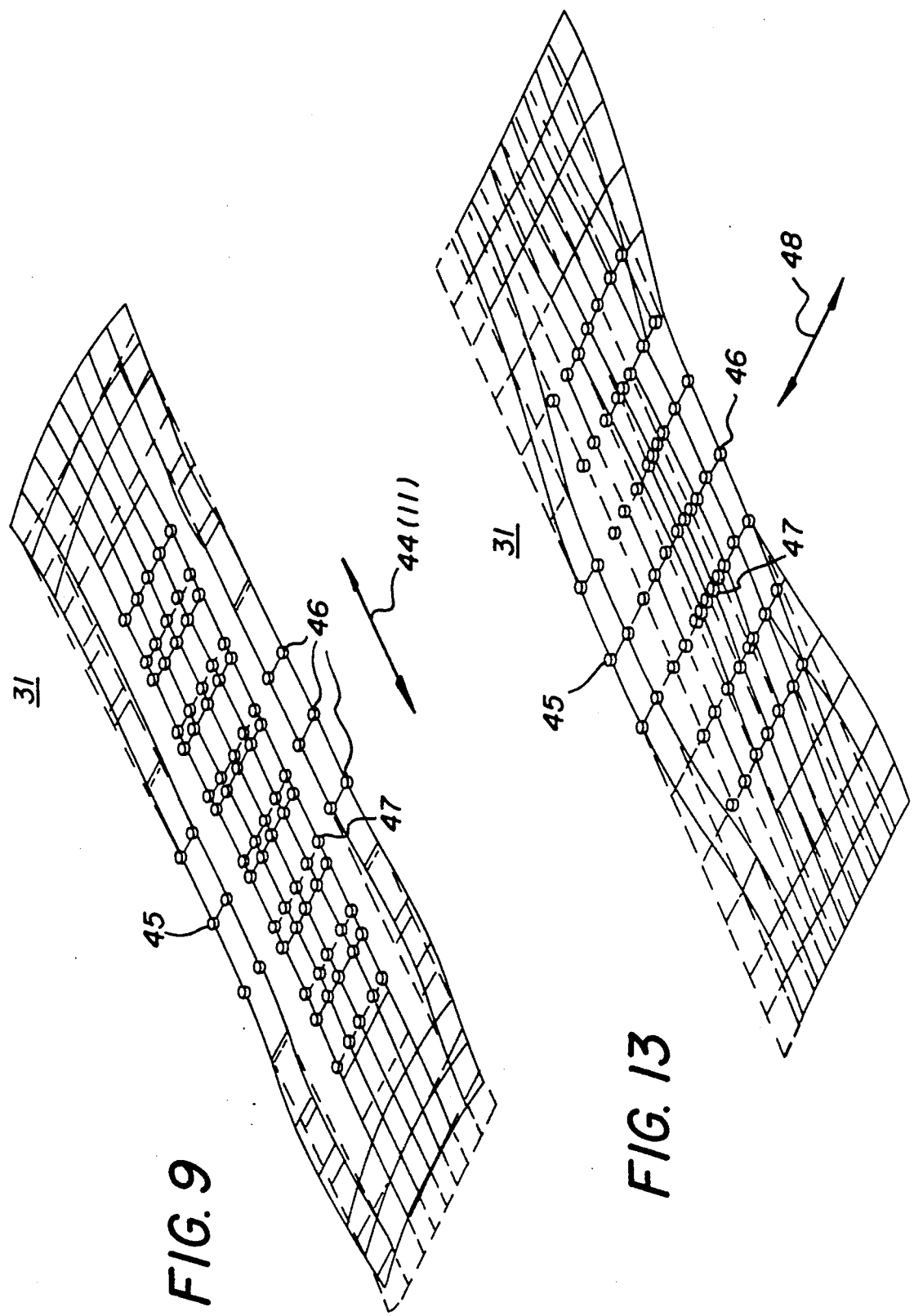
FIG. 9 is a diagram representing the vibration mode of the gimbal spring of FIG. 5 which is moved in the longitudinal direction of the central leg portion of the gimbal spring, obtained by a computer simulation.
FIG. 13 is a diagram representing the vibration mode of the gimbal spring of FIG. 5, moved in the another seek direction.

FIG. 9 is a computer simulation diagram representing the vibration mode of a gimbal spring, the dimensions of which is the same as those of the gimbal spring 31 of FIG. 5, where the seek direction 44 is taken in the longitudinal direction of the central leg portion 35. In the diagram, the points 45 and 46 represent the fixing points of the gimbal spring 31 to the load beam 30, and the point 47 represents the fixing point of the head slider 32 to the gimbal spring 31. According to the simulation, the resonant frequency is proved to be approximately 38 kHz, sufficiently high. As seen from the diagram, each side leg portion is fixed at an area extending between three points 46. Such adhesion between the side leg portions, 33 and 34, and the surface of the load beam 30 is available only in a simulation, but not practical since the adhesion can not be performed by spot welding. However, it is found by the computer simulation that the above-described adhesion of the simulation is more preferable to obtain a higher resonant frequency of the gimbal spring 31.

In practice, the tabs 38 and 39 for extending the welding area are indispensable for spot welding. Thus, the suspension mechanism of the embodiment is useful for a compact recording disk apparatus having a suspension mechanism of the arrangement type C and a high speed seek operation.

Figure 11:
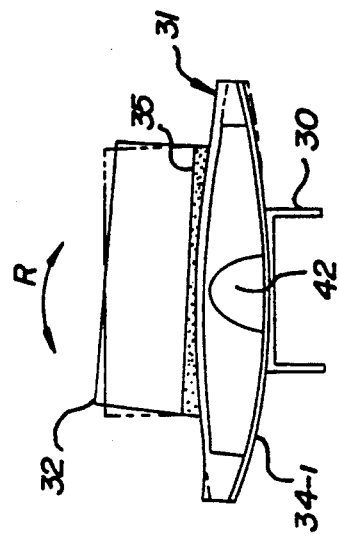
FIG. 10 and FIG. 11 are substantially schematic cross-sectional views of the head slider of FIG. 5, taken along the line X—X, illustrating the rolling movements in opposite sides of the head slider.
Figure 10:
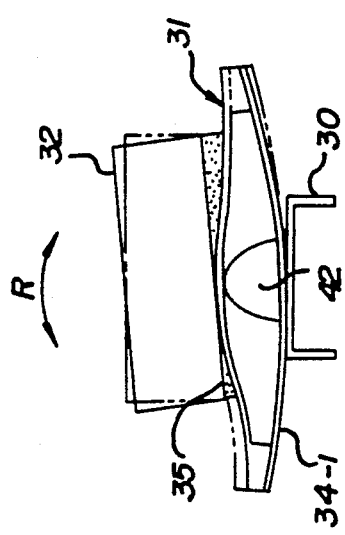

FIG. 10 and FIG. 11 are substantially schematic cross-sectional views of the head slider 32 taken along the line Y—Y shown in FIG. 5, illustrating a rolling movement of the head slider 32 in a rolling direction R during a seek operation in the seek direction 44. The rectangular figures of chained lines in the drawings represent the normal position of the head slider 32. The head slider 32 is slightly rotated counter-clockwise in FIG. 10, and clockwise in FIG. 11.

Figure 12:
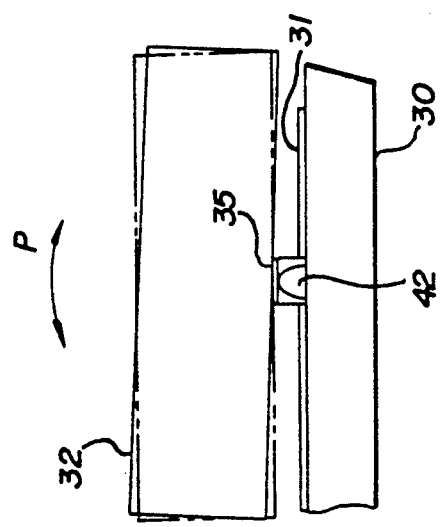
FIG. 12 is a substantially schematic cross-sectional view of the head slider of FIG. 5 taken along the line Y—Y, illustrating the pitching movement of the head slider.

FIG. 12 is a substantially schematic cross-sectional view of the head slider 32, taken along the line X—X of FIG. 5, illustrating a pitching movement of the head slider 32 in a pitching direction P during a seek operation performed in the direction 44. The head slider 32 is slightly rotated clockwise in this figure.

These rolling movement and the pitching movement of the head slider 31 around the dimple 42 are effectively damped by resisting force provided by the gimbal spring 31. The resisting force is caused by bending or torsional stress in the leg portions of the gimbal 31 corresponding to the movement of the head slider 32.

FIG. 13 is a computer simulation diagram representing the vibration mode of the gimbal spring 31 of FIG. 5. In the simulation, the seek direction 48 is taken in a direction X—X normal to the longitudinal direction of the central leg portion 35. In the diagram, the points 45, 46, and 47 represent the same fixing points as those of FIG. 9. The resonant frequency in the seek direction 48 is approximately 10 kHz, favorably higher as compared with that the previously described gimbal spring of prior art, namely 5 kHz, implying some possible application to a suspension mechanism movable in the seek direction 48 normal to the longitudinal direction of the central leg portion 35.

In the following, a modified embodiment is disclosed. FIG. 14 is a partial plan view of a suspension mechanism of the modified embodiment illustrating the assembly relationship between a gimbal spring, a head slider 32 and a load beam 30, wherein the longitudinal direction of the head slider 32 and the gimbal spring 33 is rotated by a right angle as compared with that of FIG. 5. FIG. 15 is a cross-sectional side view of the suspension mechanism of FIG. 14 taken along a line Z—Z shown in FIG. 14. The line Z—Z coincides with the longitudinal center line of a load beam 30 and that of a central leg portion 35 of a gimbal spring 31A. Naturally, the suspension mechanism of this type is applied to a recording disk apparatus having a swinging head positioner of the type B arrangement. Thus the seek direction 49 coincides with the direction of the longitudinal center line of the load beam 30, while the seek direction 44 of the suspension mechanism of FIG. 5 is normal to the longitudinal center line of the load beam 30. In order to mount the gimbal spring 31A on the load beam 30, the length of a mounting tab 34A is shortened to reduce the whole width L of the gimbal spring 31A for being adaptable to the short width of the load beam 30.

FIG. 16 is a plan view of a modified gimbal spring 31B. The gimbal spring has not always a rectangular plan view. The gimbal spring 31B has rounded forms comprising a central leg portion 35B, and side leg portions 33B and 34B, as shown in FIG. 16. Another different form can be adopted for increasing the easiness of fabricating work of the gimbal spring and assemble work thereof to the relevant load beam.

A loading protrusion may be formed on a gimbal spring instead on a load beam. FIG. 17 is a cross-sectional side view of a modified gimbal spring 31C taken along the longitudinal center line of its central leg portion 35C. The loading protrusion 42C is formed in the substantially central portion of the central leg portion 31C, and is in contact with the top surface of a load beam 30C at a loading point O in the vicinity of the free end of the load beam 30C, when the gimbal spring 31C is mounted on the load beam 30C.

The many features and advantages of the present invention are apparent from the detailed specification, and thus, it is intended by the appended claims of the apparatus which fall in the true spirit and scope of the invention. Further, since numerous modifications and changes will readily occur to those skilled in the art, it is not desired to limit the invention to the exact construction and operation illustrated and described. Accordingly, all suitable modifications and equivalents may be restored to falling within the scope and spirit of the invention.

We claim:

1. A suspension mechanism of a recording disk apparatus for suspending a transducer over a rotating recording disk with a predetermined spacing therebetween, and for transferring said transducer in a seek direction, said suspension mechanism comprising:
   a load beam having a resilient section for generating loading force and a loading protrusion forming a loading point at a surface portion in the vicinity of a free end of said load beam;
   a gimbal spring, having a central leg portion with a top surface and a rear surface and two side leg portions disposed in parallel with and on opposite sides of said central leg portion, each being connected thereto at each end thereof, said side leg portions being fixed to said surface portion of said load beam at each of a plurality of fixing positions, enabling said loading protrusion to contact with the rear surface of said central leg portion such that said loading point and said fixing positions are substantially aligned in a direction normal to the seek direction of said transducer; and
   a head slider carrying said transducer, said head slider being adhered to the top surface of said central leg portion.

2. The suspension mechanism of claim 1, wherein said central leg portion of said gimbal spring is raised above said load beam surface portion.

3. The suspension mechanism of claim 2, wherein said gimbal spring further has two cross leg portions, each having a raised portions for supporting said central leg portion at opposite ends of said central leg portion in a raised manner.

4. The suspension mechanism of claim 1, wherein each of said side leg portions of said gimbal spring further has a mounting tab extending outwardly from said gimbal spring, and said fixing positions are located at said mounting tabs.

5. The suspension mechanism of claim 1, wherein said mounting tabs are fixed to said load beam by spot welding.

6. The suspension mechanism of claim 1, wherein said gimbal spring is made of a plate of resilient material with uniform thickness.

7. The suspension mechanism of claim 6, wherein said resilient material is resilient stainless steel.

8. The suspension mechanism of claim 1, wherein a longitudinal direction of said central leg portion coincides with said seek direction of said transducer.

9. The suspension mechanism of claim 1, wherein a longitudinal direction of said central leg portion is normal to a substantially longitudinal center line of said load beam.

10. The suspension mechanism of claim 1, wherein a longitudinal direction of said central leg portion coincides with a substantially longitudinal center line of said load beam.

11. The suspension mechanism of claim 1, wherein said head slider is adhered to the top surface of said central leg portion using adhesive material.

12. The suspension mechanism of claim 1, wherein said transducer is a magnetic transducer.

13. The suspension mechanism of claim 1, wherein said transducer is an optical transducer.

14. A suspension mechanism for suspending a transducer over a rotating recording disk with a predetermined spacing therebetween, said suspension mechanism comprising:
   a rigid arm of a head positioner for positioning a head slider on tracks of said disk;
   a flexible load beam having a holding section, a resilient section, and a rigid section connected to each other in the recited order, said load beam being secured to said rigid arm at said holding section and having a load protrusion on a surface of said rigid section at a free end thereof;
   said head slider carrying said transducer; and
   a gimbal spring made of resilient plate of uniform thickness, said spring being fixed to a portion of said rigid section of said load beam in the vicinity of the free end of said load beam, wherein said gimbal spring comprises:
   a central leg portion, on a top surface of which said head slider is adhered,
   two side leg portions formed in parallel with and located at opposite sides of said central leg portion,
   two cross leg portions, each having folded raised portions joined to said central leg portion with said folded raised portions connecting said side leg portions with said central leg portion at opposite end portions of said central leg portion and each of said side leg portions, forming a substantially rectangular gimbal spring and raising said central leg portion from a plane of said side leg portions, and
   two mounting tabs connected, respectively, to each of said side portions and extending outside said gimbal spring, whereby said gimbal spring is secured to said load beam at a securing area of each of said mounting tabs, said load protrusion being in contact with the rear surface of said central leg portion at a loading point thereon so as to form a universal joint connection such that said loading point and each said securing area of said mounting tabs are substantially on a line directed normally to a seek direction of said head slider.

15. A head suspension mechanism comprising:
   a flexible load beam having a planar surface at a free end thereof;
   a gimbal spring having a central leg portion and two side leg portions disposed in parallel and on opposite sides with respect to said central leg portion, said central leg portion being raised from a plane of said side leg portions and being connected at each and thereof to each end of each side leg portion; and a head slider carrying a transducer, said head slider being adhered to a top surface of said central leg portion, whereby loading force is imposed to a rear surface of said central leg portion at a loading point, said side leg portions being fixed to the surface of said load beam at each of a plurality of fixing positions, such that said loading point and said fixing positions are substantially aligned in a direction normal to a seek direction of said transducer.

16. The head suspension mechanism of claim 15, wherein said load beam has a loading protrusion on a portion of said load beam in the vicinity of the free end of said load beam, said loading protrusion contacting said central leg portion at a central area thereof.

17. The head suspension mechanism of claim 15, wherein said central leg portion of said gimbal spring has a loading protrusion on a substantially central portion of said central leg portion contacting said load beam planar surface adjacent said free end.

* * * * *